Figure 1:
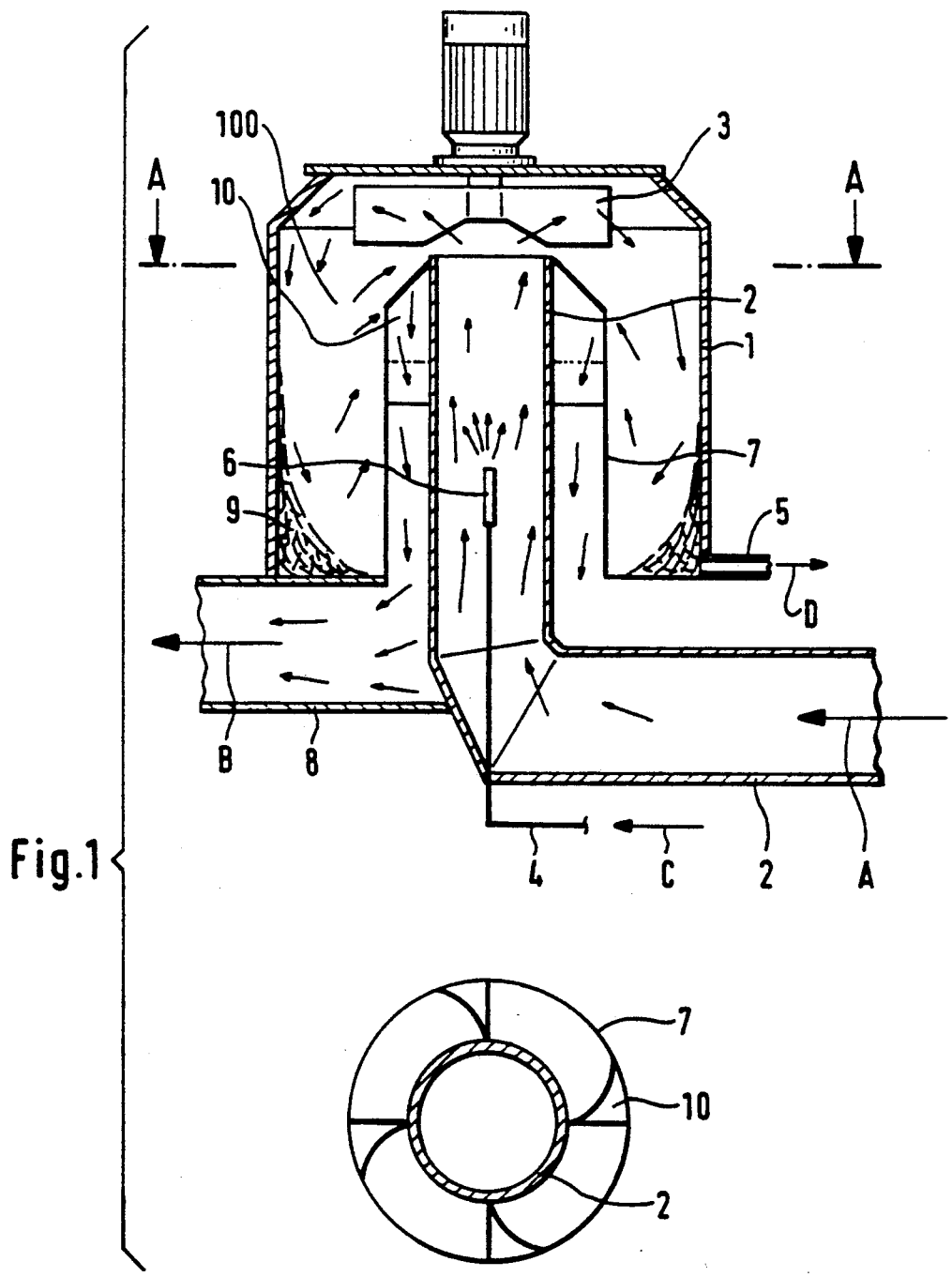

United States Patent [19]
Jarvenpaa

[11] Patent Number: 5,181,944
[45] Date of Patent: Jan. 26, 1993

[54] WET BLASTER/WET WASHER

[75] Inventor: Viljo Jarvenpaa, Kerava, Finland

[73] Assignee: Wiser Oy, Finland

[21] Appl. No.: 776,425

[22] PCT Filed: Apr. 10, 1991

[86] PCT No.: PCT/FI91/00107

§ 371 Date: Nov. 18, 1991

§ 102(e) Date: Nov. 18, 1991

[87] PCT Pub. No.: WO91/15283

PCT Pub. Date: Oct. 17, 1991

[30] Foreign Application Priority Data

Apr. 11, 1990 [FI] Finland ............................ 901827

[51] Int. Cl.$^5$ ............................................ B01D 47/06
[52] U.S. Cl. ........................................ 55/235; 55/237;
                                                 55/238; 55/398
[58] Field of Search ............... 55/226, 230, 235–239,
                                                 55/398

[56] References Cited

U.S. PATENT DOCUMENTS

| | | | |
|---|---|---|---|
| 3,468,614 | 9/1969 | Nilsson | 55/230 X |
| 3,538,684 | 11/1970 | Esterhoy et al. | 55/238 X |
| 3,960,524 | 6/1976 | Cumpston | 55/230 X |
| 4,243,396 | 1/1981 | Cronenberg | 55/238 X |
| 4,478,616 | 10/1984 | Jarvenpaa | 55/235 X |
| 4,963,329 | 10/1990 | Burgess et al. | 55/257.1 X |

FOREIGN PATENT DOCUMENTS

| | | |
|---|---|---|
| 0325752 | 9/1920 | Fed. Rep. of Germany . |
| 0466352 | 10/1928 | Fed. Rep. of Germany . |
| 2030009 | 1/1972 | Fed. Rep. of Germany . |

OTHER PUBLICATIONS

Derwent Abstract No. 86-237450/36.

Primary Examiner—Charles Hart
Attorney, Agent, or Firm—Steinberg & Raskin

[57] ABSTRACT

The invention relates to a wet blaster/wet washer, in which the blaster is an essential component, from which the outlet occurs in accordance with the invention from the middle section of a hood via a ring channel formed by a pipe channel (7) concentric with an inlet channel (2). The centrifugal field caused by an impeller (3) of the blaster slings the massive liquid exceeding the saturation point out of the gas, and the washed, treated, transferring gas thereby dries out of the liquid. The separated liquid is removed as a flow (D) by using a suitable outlet (5).

6 Claims, 2 Drawing Sheets

WET BLASTER/WET WASHER

The invention relates to a wet blaster/wet washer for wetting a gas and for drying the excess liquid, which wet washer comprises a chamber provided with a central impeller and a central inlet channel having one or more liquid feeds.

Several different possibilities of realizing gas cleaning are known. The most usual way is to use a simple cyclone separator, or a vortex separator. Only coarser dust particles can be removed by means of this method. Very fine particles ($<10$ μm) penetrate through the cyclone, as the specific weight of the dust to be separated corresponds to the specific weight of silicate minerals (ca. 2 g/cm$^3$). Therefore, the use of cyclones is not very practical in normal operating conditions. They are, however, commonly used as preseparators, in which case the final separation is realized with other separators by utilizing either a day filter or a wet washer.

In a dry filter, the dust separation occurs by using a filter cloth. In this case, the dust particles are screened into the cloth and the penetrated gas is clean. The tightness of the cloth, i.e. the size of the fiber openings of the cloth, determines the size of the particles leaving the filter. It is quite usual that the mesh size of the filter cloth is less than 3 μm. The size of the dust particles penetrating through the cloth then in practice remains less than 2 μm. Even tighter clothes are used, but when the tightness increases, more and more energy is needed as a so-called pressure loss to allow the gas to penetrate through. The filter structure is termed according to how the filter is placed, e.g. as a pocket, hose, plate, etc.

A name and a principle is also given to the dry filter according to how the filter cloth is cleaned of the filtered dust. Currently, the newest filters are cleaned with pressure impulses, which refer to a vigorous and sudden pressure shock against the filter cloth and generally further against the flow direction of the gas to be cleaned.

A third way of removing solid dust particles from gases is to use an electric filter, in which the impurity particles of the gas are charged by the action of electric contact elements in a high electric field either positively or negatively. It is important and essential that the gas with its dust particles continues its travel and is subjected to the area of influence of another, opposite electric field, an electrode, whereby a charged dust particle clings to this electrode and thus leaves the gas flow. In this manner, even large quantities of dust particles can be removed from the gas, the efficiency being relatively good. The result is often satisfactory. Electric filters are expensive and they are also intended for larger quantities of gas. Thus, electric filters are generally used for cleaning process gases, whereby the separated or recovered dust can be extremely valuable.

For example a device according to the FI patent application 1704/71 is previously known, in which a relatively coarse material is separated from a gas flow, whereby a plate construction directs an air flow and the material therein along an outer wall via an opening on the outer wall at the lower end together with a small amount of transfer gas (ca. 10%). The remaining air leaves through the middle section of the separator. This known solution is intended for the separation of the coarse part of a granulous material, whereby the air travelled with the material via the outer wall is cleaned in a separate collecting container. The remaining air (ca. 90%) leaves via a space between a guiding spiral and a pipe located outside an outlet channel into the outlet channel. This gas contains a fine dust, which then has to be separated with a separate filter.

In the case of the dry filters described above it is common that they cannot remove e.g. detrimental gas components from the gases. The gases are often too hot especially for dry filters. Therefore, the gases have to be cooled or dilute, which causes additional costs and essentially increases the amount of gases. A wet washer can receive gases when they are hot depending on the construction of the wet washer and also on the washing liquid used, its composition and quantity.

It is essential in a wet washer how the gas is led to the washer. The most usuaL way is to wash the gas only in a suitable shower space, in which a blaster forms a totally separate unit. Several different solutions can thus be distinguished, but it is important that the gas and the washing liquid in the wet washer enter into contact with each other and that the gas leaving the unit does not contain washing liquid at least in a massive form, i.e. over the saturation limit. This arrangement and result have been achieved by means of the inventive solution, which actually and principally is a wet washer.

The wet blaster/wet washer according to the invention is mainly characterized in that the gas led to the impeller and departed therefrom is led out of the blaster space back in a direction opposite to the incoming direction via an intermediate channel formed by the inlet channel located in the middle section of the blaster space and by a pipe concentric with the inlet channel.

In the inventive wet blaster/wet washer, the gas is wetted and dried, and in addition, the gas departs from the blaster via the middle section of a hood, whereby the outlet direction is via an intermedia space formed by an inlet pipe of the impeller and a pipe disposed around it.

Figure 2:
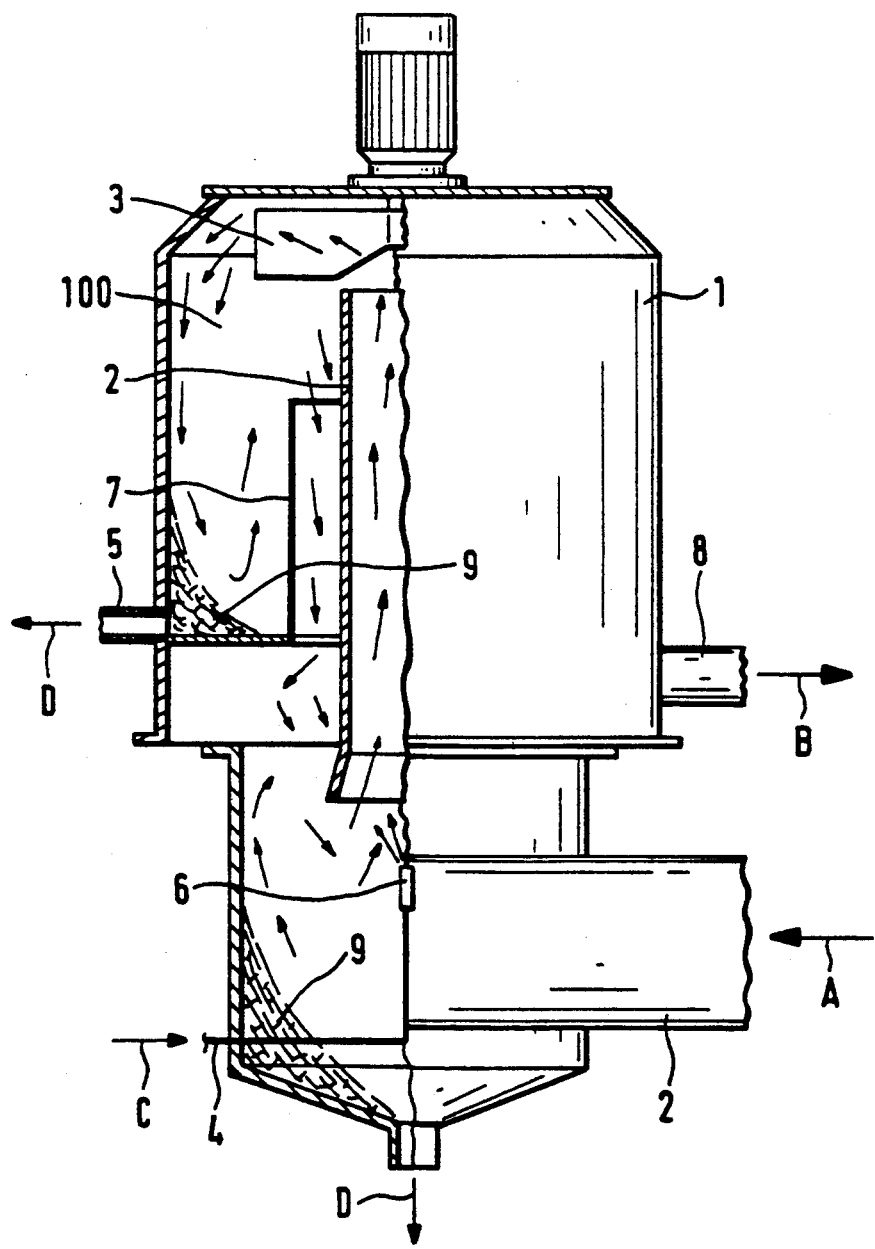

The device is best illustrated by the enclosed FIGS. 1 and 2, of which

FIG. 1 shows the most simple solution and

FIG. 2 shows a solution, a so-called wet washer, in which the gas is prewetted and heavy and most of the dust is simultaneously preseparated before leading it to an impeller and the wet blaster. This solution can prevent the impeller from wearing too much and sticking in connection with large quantities of dust. The following description is based on the figures and illustrates the operation and principle of the device.

A gas flow A flows in an inlet channel 2 into an inlet opening of a blaster 3. One or more liquid feeds 4 can be connected to the inlet channel 2, and the liquid flowing therein is dispersed by means of a nozzle 6, whereby the spray wets the gas as completely as possibly, preferably considerably over the condensation point. The impurities in the gas, both solid and gaseous, then wet, react with the liquid, etc. After flowing out of the blaster 3, such a mixture transfers from an underpressure state (before the blaster 3) into an overpressure state.

The liquid then tends to condensate into droplets, whose condensation elements are most of all solid particles. In this way, they become heavier and heavier and are forced by the action of a large centrifugal field, since the gas vigorously circulates after the blaster in a space 1, to fly against outer walls 1, and at the same time, the flowing direction of the gas heavily presses the particle droplets concerned in the direction of the flow arrows shown in FIG. 1. The liquid, the gases dissolved therein and the solids are forced into a circulating movement and accumulate as a liquid turbulence 9, from which it is possible to remove liquid via a liquid outlet opening 5. By fitting the liquid outlet 5 suitable, a suitable liquid turbulence 9 can be achieved on the wall 1 to wet the wall 1, which prevents possible accumulations and blockings on the wall 1.

The centrifugally dried gas departed from the blaster 3 is forced in a pressurized state to discharge from a space 100 into an intermediate space formed by the inlet channel 2 and a channel 7 preferably concentric with it and via this space into an exhaust channel 8 as a flow B. The pipe 7 starts from a suitable distance lower than the blaster, whereby a suitable ring opening remains below the blaster to guide the flow into a ring pipe formed by the channels 2 and 7.

FIG. 2 shows in principle the same solution but it has been completed in such a way that the incoming gas flow A is at its initial end subjected to prewetting, to a certain wet cyclone known per se, in which the liquid is circulated in a manner known per se, so that the gas enters into a as good as possible good contact with the liquids, whereby abrasive solids cannot enter the impeller 3. The further wetting of the gas via the nozzle 6 occurs as in FIG. 1. In the prewetting according to FIG. 2, an exactly corresponding liquid turbulence 9 can occur as in FIG. 1. The wetting liquid flows as outlets D from both wetting compartments and the liquids can be treated either in the same devices or separately in manners known per se.

In FIGS. 1 and 2, the devices are shown in a vertical position, but it is evident that since the centrifugal fields are many times greater than the earth's gravitation g, it is possible to place the devices also in other positions.

Since the gas circulates vigorously in the space 100 and this circulating movement contains a considerable amount of energy, it is possible and preferable to place in the intermediate space between the channels 2 and 7 guide plates 10 to change the circulating movement into a nearly longitudinal movement of the channel and thereby regain energy for the flowing movement. In this way, it is possible to decrease the pressure loss otherwise occurring in the inventive wet blaster, because the gas is forced to discharge in the direction of the center axis of the blaster, deviating from the normal discharge occurring from the outer periphery.

By means of the inventive solution and device, the gas can be readily wetted thoroughly without that it is detrimental because of too high a liquid content of the outlet. The device solution itself is small in size and easy to realize. It is easy to eliminate also large quantities of dust before they can enter the blaster, and wearing and imbalances can thereby be avoided, which are general problems when a solid clings to or accumulates on the impeller.

The representation above describes one realization model of a wet blaster and a prewetting/washing device to be connected to it. It is possible to form several device aggregates on the basis of the same solution principle, but when they relate to the realization principle according to the invention, they can be considered to be included within the scope of the invention.

I claim:

1. A wet blaster/wet washer for wetting a gas and for drying the excess liquid, comprising
   a blaster space in which a gas is wetted and excess liquid is dried,
   a central impeller located in said blaster space, said central impeller imparting a circulating movement to the gas,
   a pipe located in said blaster space, said pipe having an opening toward said central impeller,
   a central inlet channel arranged concentrically in said pipe, said central inlet channel directing the gas into said blaster space in an incoming direction and toward said central impeller,
   at least one liquid feed located in said central inlet channel, said liquid feed injecting a first liquid into the gas such that the gas is wetted by said first liquid, and
   an intermediate channel defined between said central inlet channel and said pipe, the gas being removed from said blaster space through said intermediate channel in a direction opposite to its incoming direction.

2. A wet blaster/wet washer according to claim 1, further comprising guide plates located in said intermediate channel, said guide plates structured and arranged to stop said circulating movement of the gas.

3. A wet blaster/wet washer according to claim 1, further comprising treatment means arranged to wet, wash and cool the gas by means of a second liquid before the gas flows into said central inlet channel.

4. A wet blaster/wet washer according to claim 3, wherein said first and said second liquids are the same.

5. A wet blaster/wet washer according to claim 1, wherein said wet blaster/wet washer can be installed in a vertical or horizontal position or some other position.

6. A wet blaster/wet washer according to claim 3, wherein said first and said second liquids are different.

* * * * *